United States Patent
Matsuda (10) Patent No.: US 7,080,091 B2
(45) Date of Patent: Jul. 18, 2006

(54) INVERTED INDEX SYSTEM AND METHOD FOR NUMERIC ATTRIBUTES

(75) Inventor: Yasuhiro Matsuda, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 300 days.

(21) Appl. No.: 10/160,763

(22) Filed: May 31, 2002

(65) Prior Publication Data

US 2003/0225779 A1 Dec. 4, 2003

(51) Int. Cl.
 *G06F 17/30* (2006.01)
(52) U.S. Cl. .................. 707/102; 707/101; 709/330
(58) Field of Classification Search ............ 707/1, 707/2, 3, 8, 10, 101, 102; 709/330
 See application file for complete search history.

(56) References Cited

U.S. PATENT DOCUMENTS

| | | | |
|---|---|---|---|
| 5,758,353 A | 5/1998 | Marquis | 707/201 |
| 5,852,821 A | 12/1998 | Chen et al. | 707/2 |
| 2001/0000536 A1 | 4/2001 | Tarin | 707/102 |
| 2002/0194184 A1 | 12/2002 | Baskins et al. | 707/100 |
| 2003/0088715 A1 | 5/2003 | Chaudhuri et al. | 709/330 |

OTHER PUBLICATIONS

Nist Web page. http://www.nist.gov/dads/HTML/invertedindex.html printed Jul. 26, 2005.*

* cited by examiner

*Primary Examiner*—Jeffrey Gaffin
*Assistant Examiner*—Hassan Mahmoudi
(74) *Attorney, Agent, or Firm*—McDonald Hopkins Co., LP (57) ABSTRACT

A system and method is provided for generating an inverted index and processing search queries using the inverted index. To increase efficiency for queries having multiple numeric range conditions, numeric attributes are tokenized into a plurality of tokens based on their binary value. The tokens become keys in the inverted index. A numeric range query is translated into a query on multiple tokens and combining two or more range queries on different attributes becomes a simple merge of document identification lists.

24 Claims, 4 Drawing Sheets

INVERTED INDEX SYSTEM AND METHOD FOR NUMERIC ATTRIBUTES

CROSS-REFERENCE TO RELATED APPLICATIONS

The present application claims the benefit of U.S. Provisional Patent Application, Ser. No. 60/379,600, entitled "Inverted Index System and Method For Numeric Attributes", which was filed on May 9, 2002.

FIELD OF THE INVENTION

The invention relates to data indexing and retrieval. It finds particular application to a method and system of generating an inverted index for numeric attributes and processing queries using the same.

BACKGROUND

In typical database systems, users store, update, and retrieve information by interacting with user applications ("clients"). The clients respond to the user's interaction by submitting commands to a database application (a database management system/a "database server") responsible for maintaining the database. The database server responds to the commands by performing the specified actions on the database. To be correctly processed, the commands must comply with the database language that is supported by the database server. One popular database language is known as Structured Query Language (SQL).

One common configuration of a database is one made up of various tables with each table being formed of rows and columns of information. The information stored across one row in the table would make up one record and the fields of the record would be columns in the table. In other words, the table would contain rows of individual records and columns of record fields. Because one record may contain more than one field of information, the information of the field would make up the columns of the database table. Other database configurations are known in the art.

An index is commonly used by database management programs to provide quick and efficient associative access to a table's records. Indexes are commonly configured in a B-Tree structure which includes a root node with many levels of nodes branching from the root node. The information contained in these nodes may include pointers which point to the nodes at the next level of the tree or it may include pointers which point to one or more records stored in the database. These pointers include additional key record information which may reference the records stored in the database. The record keys are stored in an ordered form throughout the nodes at the various branches of the tree. For example, an index tree may exist for selected attributes such as an alphabetic listing of employee names.

To support dynamically changing attributes, prior systems created a b-tree for each attribute. Another approach included having one b-tree that is created on a name-value pairs or all attributes. In either of these approaches, a query processor had to decide which search condition should use a b-tree, then scan the b-trees, combine the results and perform filtering, if necessary, to obtain a final answer to the query.

Prior solutions tend to be costly when intermediate results include large amounts of data. Much of the cost is associated with sorting overhead for combining intermediate results and I/O cost for filtering. This is typically the case when a query includes multiple numeric range conditions that may result in large amounts of intermediate data before a final result is found.

The present invention provides a new and useful method and system of indexing and searching that addresses the above problems.

SUMMARY

In one embodiment, a system of generating an inverted index from a data repository is provided. A data retriever retrieves selected numeric attributes from the data repository. A tokenizer generates a plurality of tokens from each of the numeric attributes based on a binary value of each numeric attribute. An indexer then generates an inverted index using each of the plurality of tokens as a key.

In accordance with another embodiment of the present invention, a process of generating an inverted index from numeric values contained in a data repository is provided. A binary value is determined for each of the numeric values. For each numeric value, the binary value is tokenized into a plurality of bit tokens where each of the plurality of bit tokens includes a different number of bits from the binary value. An inverted index is generated using the plurality of bit tokens from each numeric value as an index key.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the embodiments of the system and method.

DETAILED DESCRIPTION OF ILLUSTRATED EMBODIMENTS

The following includes definitions of exemplary terms used throughout the disclosure. Both singular and plural forms of all terms fall within each meaning:

"Document", as used herein, generally refers to an object or entity that contains information. It includes but is not limited to one or more electronic documents, files, web pages, network addresses or links, database addresses or records, or any object (text or non-text) that has one or more attributes that can be searched.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be filly embodied as software.

"Signal" as used herein, refers to one or more electrical signals, analog or digital signals, one or more computer instructions, a bit or bit stream, or the like.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Figure 1:
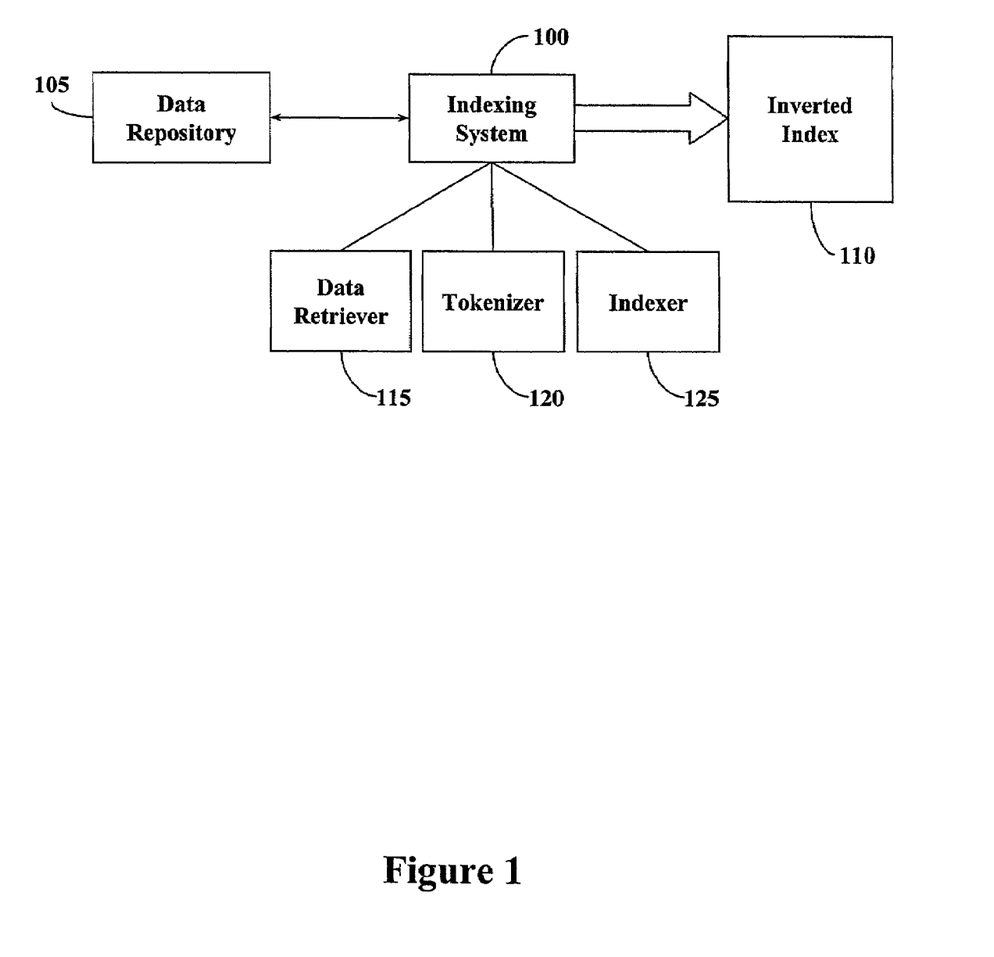
FIG. 1 is an example overall system diagram of one embodiment of the indexing system of the present invention.

Illustrated in FIG. 1 is one embodiment of an indexing system 100. Generally speaking, the indexing system 100 provides an efficient way of processing a database or other type of search query that involves multiple numeric range queries on multiple numeric attributes. The indexing system 100 transforms numeric values from a data repository 105 into multiple tokens and creates an inverted index 110 using the tokens as keys. Once the inverted index 110 is created, a numeric range query is then processed by translating the numeric range query to a query on multiple tokens. As will be described in greater detail below, combining two or more range queries on different attributes becomes a simple merge of document identification lists.

In this embodiment, the indexing system 100 is embodied as software having computer executable instructions that cause a computer to behave in a prescribed manner. The software may be stored in a computer readable medium such as a magnetic, optical, or digital storage, an electronic memory, or any combination of these mediums. To build the inverted index 110, a data retriever 115 scans and reads numeric values from the data repository 105 associated with a selected attribute. Exemplary attributes may include price, date, value, quantity, or any other attribute that contains a numerical value.

Figure 4:
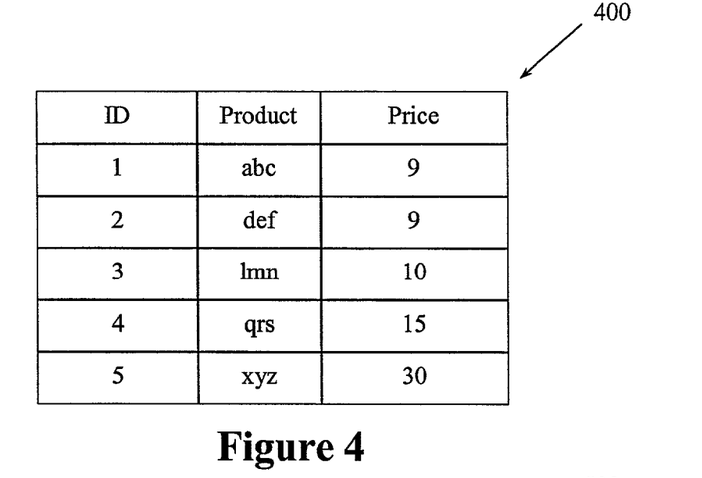
FIG. 4 is an exemplary data repository.

An exemplary data repository 105 is shown as a repository table 400 in FIG. 4. The table 400 shows three columns that represent attributes, for example, "IDs", "Product", and "Price". Of course, any number and type of attributes can be included. "IDs" represent entity or document identifiers from the repository 105 that include its corresponding Product and Price. Each row represents one record or table entry. It will also be appreciated that any number of table entries may occur. Furthermore, the table 400 may be implemented using other structures such as tree structures, arrays, or other data structures.

When building the inverted index 110, the selection of attributes is based on, for example, anticipated query requests from users that may use those attributes as operands. A binary value is then determined for each numeric value if not already in binary form. Typically, numeric values are integer or floating point numbers. The binary value is predetermined to have a selected bit length. In the following example, an 8-bit length is used but any length may be selected as appropriate.

In particular, the numeric value is represented by a fixed number of bits which satisfies the following condition: Suppose A and B are n-bit fixed length numeric data. Let the i-th bit of data X be xi. A is less than B, if and only if there exists j where for all i<j, ai=bi and aj<bj. Unsigned integers are compatible with this condition and other types of numeric data, for example, floating point numbers can be converted to a representation that conforms to this condition.

With further reference to FIG. 1, a tokenizer 120 creates a number of tokens from the binary value of each numeric value. If the fixed number of bits of the binary value is, for example, 8-bits, then the tokenizer 120 generates 8 tokens from the binary value. Where each token contains a different number of bits from the binary value. If the binary value is 00001010, which represents the number 10, the tokens are created as follows:

Token 1=0
Token 2=00
Token 3=000
Token 4=0000
Token 5=00001
Token 6=000010
Token 7=0000101
Token 8=00001010

Each token is a prefix of the binary value with the last token being the entire binary value. In general, an N-bit number=[b1, b2, b3, . . . bn] where bi is the i-th bit of the number. Converting the binary number into n-tokens becomes:

N1=[b1]
N2=[b1, b2]
N3=[b1, b2, b3]
Nn=[b1, b2, b3 . . . , bn]

where Ni is the i-th token and the size of token Ni is i bits.

Once a numeric value is tokenized, an indexer 125 builds the inverted index 110 by adding the tokens to the inverted index 110 as keys. An exemplary inverted index is shown as inverted index table 500 in FIG. 5. In this example, for each number value, eight (8) tokens are added as keys since the binary value is an 8-bit number. The eight (8) tokens generated from the number "10" are shown as keys. Each token is associated with its attribute (e.g., "Price") and a list of identifiers ("IDs") that identify each entity in the repository 102 that has that token value and attribute. In one embodiment, each entity in the repository 102 is given a number that uniquely identifies that entity. One method is to sequentially number each entity.

In another embodiment, a set of values can be used as a key. For example, the i-th token of an attribute "A" of an entity "j" can be represented as a triplet (A, T, j) where T is the value of the token. A set of the triplets are generated when all attribute values of all entities are considered. The triplets are grouped by their attribute name and token value, then are transformed into a set of a triplet (A, T, L). In this triplet, L represents a list of entity identifiers (ID list) that have the same attribute name and the same token value. The list may be sorted to increase query response time. Also, the ID list can be compressed to increase space efficiency.

Figure 3:
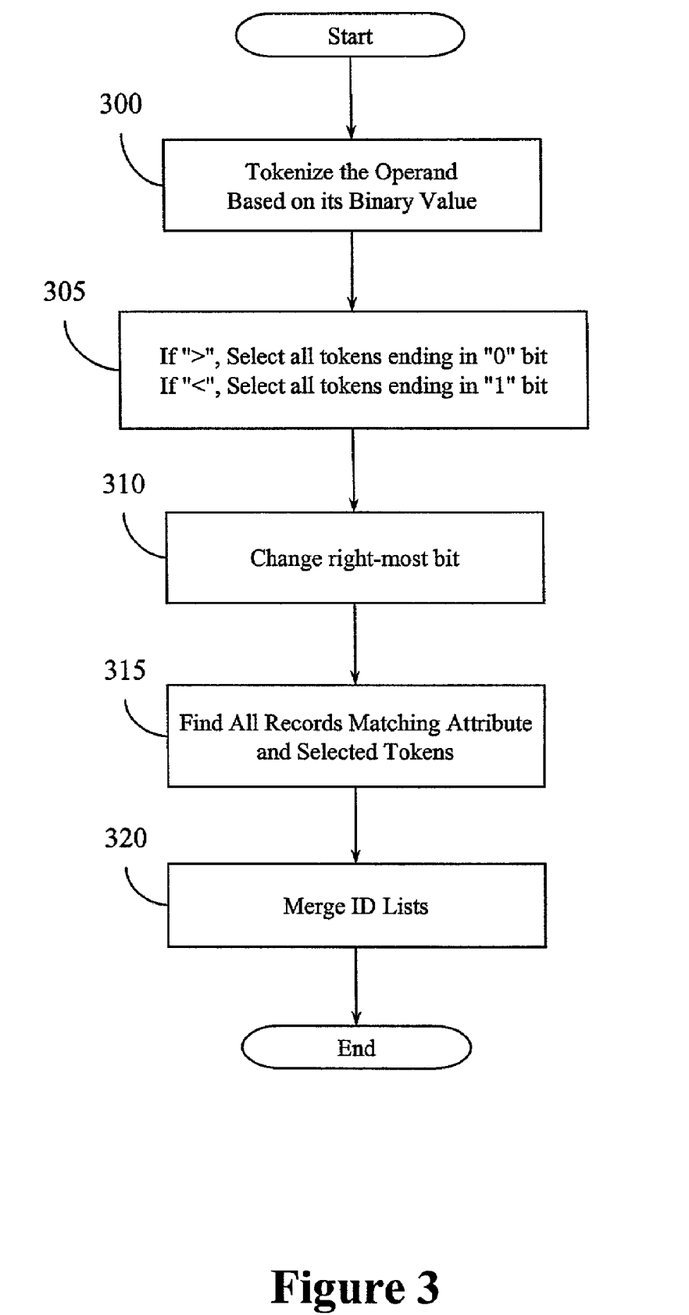
FIG. 3 is an exemplary methodology for processing a search query in accordance with the present invention.
Figure 5:
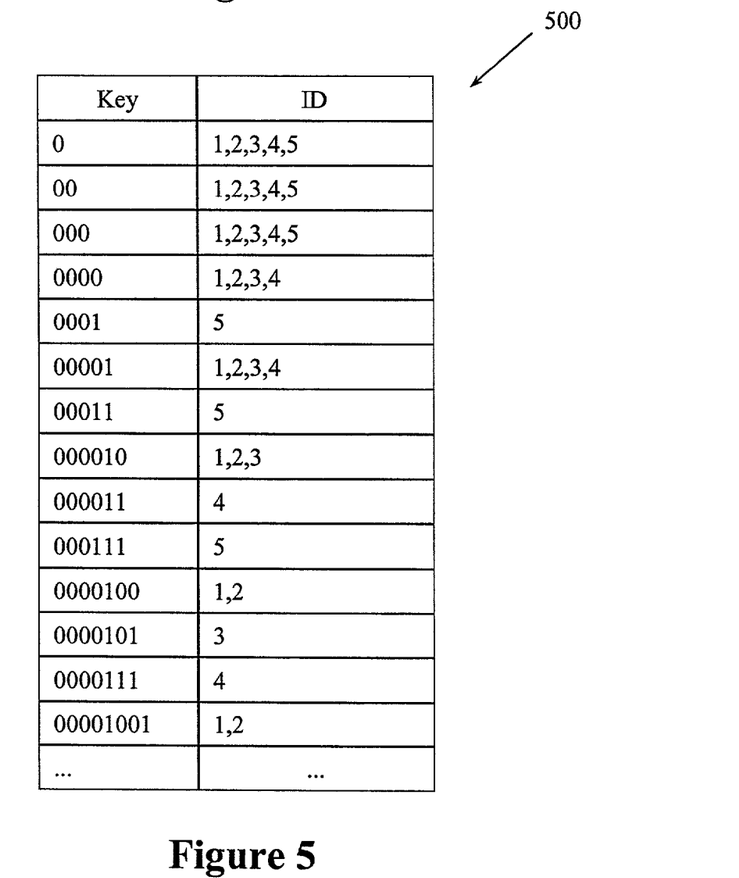
FIG. 5 is an exemplary inverted index created from the data repository shown in FIG. 4 in accordance with the present invention.

It will be appreciated that the implementation of the inverted index 110, 500 may use a variety of indexing methods, such as a B-tree structure using this type of triplet where (A, T) can be a combined key. The index may also be implemented as a hash index, an array structure (single or multi-dimensional), or other type of desired data structure. The index maps each token to an identity of document(s) that are associated to that token and attribute. Optionally, a location may be included that indicates where in the document the attribute occurs. By creating an inverted index from tokenized binary values of numeric attributes, search queries having numeric operands can be more efficiently processed as will be described in greater detail with reference to FIG.

3. In general, the numeric range query effectively becomes an equivalence search which is a simpler operation.

Figure 2:
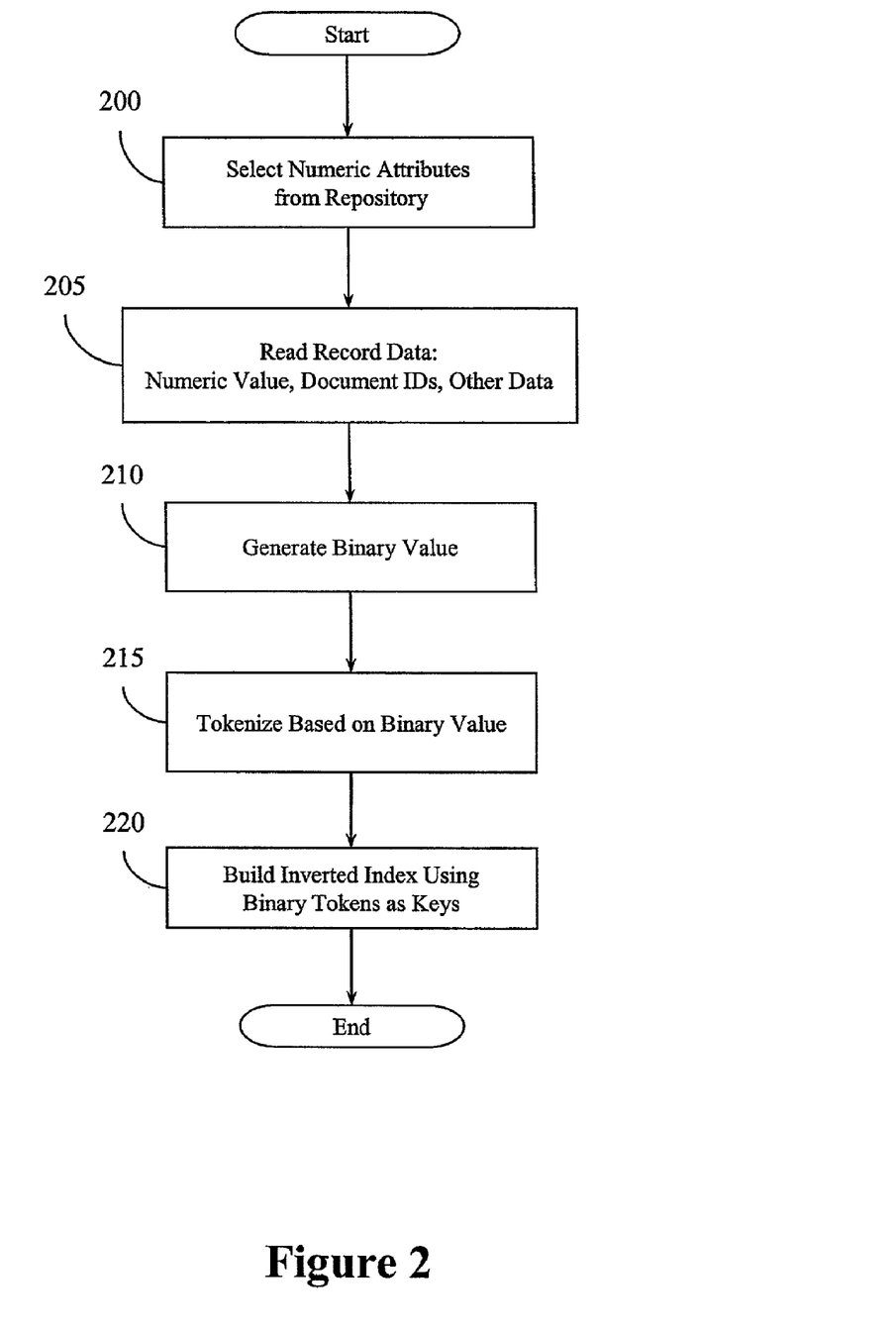
FIG. 2 is an exemplary methodology of building an inverted index in accordance with the present invention.

Illustrated in FIG. 2 is one embodiment of a methodology associated with the system of FIG. 1. The illustrated elements denote "processing blocks" and represent computer software instructions or groups of instructions that cause a computer to perform an action(s) and/or to make decisions. Alternatively, the processing blocks represent functions and/or actions performed by functionally equivalent circuits such as a digital signal processor circuit or an application specific integrated circuit (ASIC). The diagram, as well as the other illustrated diagrams, does not depict syntax of any particular programming language. Rather, the diagram illustrates functional information one skilled in the art could use to fabricate circuits, to generate computer software, or a combination of hardware and software to perform the illustrated processing. It will be appreciated that electronic and software applications may involve dynamic and flexible processes such that the illustrated blocks can be performed in other sequences different than the one shown and/or blocks may be combined or separated into additional components. They may also be implemented using various programming approaches such as machine language, procedural, object oriented and/or artificial intelligence techniques.

With reference to FIG. 2, the methodology illustrates the generation of an inverted index using binary tokens from numeric attributes. Since an index structure may contain one or more numeric attributes that may be used in an inverted index, a desired numeric attribute is selected (block 200) and data from each record is read including a corresponding numeric value, a document ID list and other associated fields from each record as desired (block 205). For each numeric value, a corresponding binary value is generated (block 210). The length of the binary value is predetermined and should be fixed for all numeric values in the current set. Although the following examples use a binary value having an 8-bit length, other bit lengths can be used such as 4, 16, 32, 64 or other desired length. Each binary value is then tokenized into one or more tokens as previously described (block 215). For an 8-bit binary value, eight (8) tokens are created where each token has a different number of bits from the binary value. The inverted index is then built by adding each binary token as a key (block 220). Thus, for each numeric value from the data repository 105, eight (8) binary tokens are created and eight (8) key entries are registered in the inverted index 110.

With reference to FIG. 3 a methodology is shown for processing a query having a numeric range in the query. An exemplary query may have a condition of (price>10) which requests to select all records where the attribute "price" is greater than "10". In this example, the operand is the numeric value "10". To process this query in accordance with one embodiment of the invention, the range query will be transformed to an equivalence search using an inverted index generated in accordance with the above-mentioned embodiments. The transformation begins by tokenizing the operand (block 300) in a similar manner as described above. An equivalent binary value is determined for the operand, in this case, "00001010" represents an 8-bit binary value of the number "10". It will be noted that the length of the binary value used here is the same length that was selected when building the inverted index.

The binary value of the operand is tokenized into 8 tokens where the i-th token has a length of i bits. Tokenizing the number "10" produces the following tokens as shown in Line (1) of Table 1. Line (2) shows selected tokens from Line (1) that end in a "0" bit (right-most bit). Line (3) shows the tokens from Line (2) with the right-most bit changed to a "1" bit. Lines (2) and (3) will be explained below.

TABLE 1

| Greater-Than 10 (00001010) |
| --- |
| (1) 0, 00, 000, 0000, 00001, 000010, 0000101, 00001010 |
| (2) 0, 00, 000, 0000,             000010,              00001010 |
| (3) 1, 01, 001, 0001,             000011,              00001011 |

The exemplary query is a simple query having a single search condition. For two numbers N and M, and their tokens {Ni} and {Mi}, if N>M, there exists, by definition, a token Nj which is greater than Mj. Let k be the smallest j, then they are equal except the last bit, and the last bit of Nk is 1 and the last bit of Mk is 0. Using the inverted index, finding entities that have the attribute "Price" whose value is greater than M (e.g. 10) can be performed as follows.

With further reference to FIG. 3, in a "greater-than" search, all tokens from the tokenized operand are selected that end in a "0" bit (block 305). (e.g., the least-significant bit, generally the right-most bit). The selected tokens in this example are shown in Line (2) of Table 1. The right-most bit in the selected tokens are than changed from a "0" to a "1" bit (block 310). The converted tokens are shown in Line (3) above. An equivalence search is now performed using the converted tokens to match keys in the inverted index which are also bit tokens. The inverted index is searched to find all matching entries having the same token and the same attribute (e.g., price) (block 315). For the equivalence match, a token "00" is not equivalent to a token of "000". Although the numeric value is the same, the strings do not match for purposes of this search. To match, two tokens will have the same number of bits (e.g. the same string length) and the same bits.

The equivalence search identifies the correct document IDs that match the condition (price>10) because all tokens that match the converted tokens from Line (3) that end in a "1" bit will have a value of price greater than "10". In other words, only numeric values that are greater than "10" will produce tokens that have a "1" bit in certain positions of the binary number. These tokens will match the tokens in Line (3). Conversely, numeric values that are less than "10" will not have a "1" bit in the positions that match the tokens in Line (3). For example, the token "000011" comes from the 8-bit binary number "000011xx" where xx is unknown from the token. Regardless of the values of the "xx" bits, this binary number has a decimal value of at least "12". Thus, any token of "000011" represents a decimal value that is greater than or equal to "12".

Returning to the search discussion, document IDs are retrieved from each matching token index which results in an ID list of all documents that match those tokens. It should be noted that the ID lists to be merged are disjoint, meaning that there should not be duplicate IDs. Also, the number of lists merges is at most n for n-bit numbers.

Alternately, in a "less-than" search, tokens are selected that end in a "1" bit". For example, with a condition of (price<10), Table 2 shows three sets of tokens from the query process. Line (1) shows the tokenized value of "10". Line (2) shows selected tokens that end in a "1" bit and Line (3) shows the selected tokens with their right-most bit converted to a "0" bit. The search then performs an equivalence search for token keys in the inverted index that match the tokens of Line (3) and the attribute of "price".

TABLE 2

| Less-Than 10 (00001010) |
| --- |
| 1) 0, 00, 000, 0000, 00001, 000010, 0000101, 00001010 |
| 2)                00001,        0000101 |
| 3)                00000,        0000100 |

For complex queries involving a combination of multiple search conditions, the search result generated by the merge operation 320 may be sorted by IDs to process the multiple conditions efficiently. A sorted result should be easily produced since each ID list should already be sorted. Combining multiple conditions using a logical operator is performed by taking a union of ID lists for the "OR" operator or taking an intersection for the "AND" operator. Because the output from both conditions are sorted, this operation requires less resources, and arbitrary combinations of logical operators can be processed efficiently.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A system, comprising:
   a data retriever for retrieving selected numeric attributes from a data repository;
   a tokenizer for generating a plurality of tokens from each of the selected numeric attributes based on a binary value of each selected numeric attribute, the tokenizer being configured to tokenize a binary value into a plurality of tokens such that one numeric attribute from the data repository creates multiple tokens to be used as multiple keys in an inverted index, each of the plurality of tokens created for a selected numeric value having a different length measured in bits; and
   an indexer for generating an inverted index using each of the plurality of tokens as a key.

2. The system as set forth in claim 1 wherein, for a numeric attribute having a binary value represented by n_bits, the tokenizer generates n_tokens from the binary value, each of the n tokens having a different length in bits, n being an integer.

3. The system as set forth in claim 2 wherein an I-th token from the n tokens has a length of I_bits, n being an integer. I being an integer.

4. The system as set forth in claim 1 wherein the system is embodied as computer executable instructions.

5. The system as set forth in claim 1 wherein the inverted index is a b-tree structure.

6. The system as set forth in claim 1 wherein the inverted index is a hash index.

7. The system as set forth in claim 1 wherein the inverted index is an array structure.

8. The system as set forth in claim 1 further including logic for generating a binary value for each numeric attribute that represents the numeric attribute.

9. The system of claim 1 where the system is embodied as processor executable instructions on a computer-readable medium.

10. A process, comprising:
    determining a binary value for each numeric value in a data repository;
    tokenizing the binary value into a plurality of bit tokens where each of the plurality of bit tokens includes a different number of bits from the binary value; and
    generating an inverted index using the plurality of bit tokens as an index key such that multiple index keys are generated for each numeric value in the data repository.

11. The process as set forth in claim 10 wherein the binary value includes n_bits and the tokenizing step creates n_tokens from the binary value, n being an integer.

12. The process as set forth in claim 10 wherein the generating step includes generating an index entry having a form of (attribute, token, list) where list is a list of entities that contain the attribute and the token.

13. The process as set forth in claim 10 wherein the inverted index is generated as a b-tree.

14. The process as set forth in claim 10 wherein the inverted index is generated as a hash index.

15. The process as set forth in claim 10 wherein the inverted index is generated as an array structure.

16. The process as set forth in claim 10 wherein the determining step includes setting a predetermined length for the binary value.

17. A computer-readable medium for providing processor executable instructions configured to perform the process of claim 10.

18. A method of data retrieval from a data repository containing data records in response to a query having a numeric operand, the method comprising the steps of:
    providing an inverted index generated from the data repository, the inverted index having an index key formed from an attribute in the data repository having numeric values, the index key being based on tokenizing a binary value of a selected numeric value into multiple binary tokens having different bit lengths where the multiple binary tokens are index keys in the inverted index that are associated to a data record containing the selected numeric value;
    determining a binary value for the numeric operand;
    tokenizing the binary value of the numeric operand into a plurality of tokens each having a different number of bits; and
    retrieving data from the inverted index by searching the inverted index based on a correspondence between the plurality of tokens from the numeric operand and the index keys of the inverted index.

19. The method as set forth in claim 18 wherein if the query includes a greater-than operator, the retrieving step includes:
    selecting tokens from the plurality of tokens that end in a zero bit;
    converting the zero bit of the selected token to a one bit; and
    matching the converted tokens to the index keys in the inverted index.

20. The method as set forth in claim 18 wherein if the query includes a less-than operator, the retrieving step includes:
    selecting tokens from the plurality of tokens that end in a one bit;
    converting the one bit of the selected token to a zero bit; and matching the converted tokens to the index keys in the inverted index.

21. The method as set forth in claim 18 wherein the query includes multiple numeric operands, the method further includes:
   repeating the determining, tokenizing and retrieving steps for each numeric operand; and
   merging data retrieved from each numeric operand in accordance with the query to obtain a resultant data list.

22. The method as set forth in claim 18 wherein the retrieving step retrieves a list of entity identifiers that are associated to an index that matches one of the plurality of tokens.

23. A computer-readable medium for providing processor executable instructions configured to perform the method of claim 18.

24. A computer-readable medium for providing processor executable instructions configured to perform a method, the method comprising:
   retrieving selected numeric attributes from a data repository;
   generating a plurality of tokens from each of the numeric attributes based on a binary value of each numeric attribute, including tokenizing the binary value into a plurality of tokens having different bit lengths such that one numeric attribute from the data repository creates multiple tokens to be used as multiple keys in an inverted index; and
   generating an inverted index using each of the plurality of tokens as a key.

* * * * *

UNITED STATES PATENT AND TRADEMARK OFFICE
CERTIFICATE OF CORRECTION

| | | |
|---|---|---|
| PATENT NO. | : 7,080,091 B2 | Page 1 of 1 |
| APPLICATION NO. | : 10/160763 | |
| DATED | : July 18, 2006 | |
| INVENTOR(S) | : Yasuhiro Matsuda | |

It is certified that error appears in the above-identified patent and that said Letters Patent is hereby corrected as shown below:

Column 2, Line 66, replace "filly" with --fully--

On the Title page, after section (22), insert:

--Related U.S. Application Data--

--(60) Provisional Application No. 60/379,600, filed May 9, 2002--

Signed and Sealed this

Twelfth Day of December, 2006

JON W. DUDAS
*Director of the United States Patent and Trademark Office*